United States Patent
Leung

(10) Patent No.: US 10,015,733 B2
(45) Date of Patent: Jul. 3, 2018

(54) METHODS AND SYSTEMS FOR TRANSMITTING AND RECEIVING DATA

(71) Applicant: Pismo Labs Technology Limited, Hong Kong (HK)

(72) Inventor: Wan Chun Leung, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 0 days.

(21) Appl. No.: 14/369,720

(22) PCT Filed: Oct. 28, 2013

(86) PCT No.: PCT/IB2013/059702
§ 371 (c)(1),
(2) Date: Jun. 30, 2014

(87) PCT Pub. No.: WO2015/063539
PCT Pub. Date: May 7, 2015

(65) Prior Publication Data
US 2015/0117467 A1 Apr. 30, 2015

(51) Int. Cl.
*H04L 29/06* (2006.01)
*H04W 48/18* (2009.01)
*H04W 4/02* (2018.01)
*H04W 88/06* (2009.01)

(52) U.S. Cl.
CPC .............. *H04W 48/18* (2013.01); *H04W 4/02* (2013.01); *H04W 88/06* (2013.01)

(58) Field of Classification Search
CPC ...... H04L 69/163; H04L 29/06; H04W 48/18; H04W 4/02; H04W 88/06

USPC ........................................................ 370/465
See application file for complete search history.

(56) References Cited

U.S. PATENT DOCUMENTS

| 2005/0138190 A1* | 6/2005 | Connor | H04L 69/16 709/230 |
| 2006/0020854 A1* | 1/2006 | Cardona | G06F 11/2005 714/13 |
| 2006/0052113 A1* | 3/2006 | Ophir | H04W 8/02 455/456.1 |

(Continued)

FOREIGN PATENT DOCUMENTS

CN          102256293 A       11/2011

OTHER PUBLICATIONS

International Search Report in International Application No. PCT/IB2013/059702, dated Jul. 28, 2014.

(Continued)

*Primary Examiner* — Ricky Ngo
*Assistant Examiner* — Ellen Kirillova
(74) *Attorney, Agent, or Firm* — Hershkovitz & Associates, PLLC; Abe Hershkovitz

(57) ABSTRACT

A method carried out by a network device comprising a plurality of network adapters for transmitting and/or receiving data through a first group of network adapters. Each network adapter of the first group of network adapters is capable of using a plurality of communication technologies for transmitting and/or receiving data. The each network adapter is configured to use a corresponding communication technology for transmitting and/or receiving data. The each network adapter is configured by a configuration corresponding to each network adapter.

18 Claims, 5 Drawing Sheets

(56) References Cited

U.S. PATENT DOCUMENTS

| | | | | |
|---|---|---|---|---|
| 2007/0286097 | A1* | 12/2007 | Davies | H04L 45/02 370/255 |
| 2009/0239468 | A1* | 9/2009 | He | H04L 63/0853 455/41.2 |
| 2009/0323570 | A1* | 12/2009 | Ginzburg | H04W 76/025 370/311 |
| 2010/0269167 | A1* | 10/2010 | Kashima | G06F 21/31 726/7 |
| 2011/0044218 | A1* | 2/2011 | Kaur | H04W 76/026 370/310 |
| 2011/0299518 | A1 | 12/2011 | Chang | |
| 2011/0317587 | A1* | 12/2011 | Lida | H04L 12/2832 370/254 |
| 2012/0076107 | A1* | 3/2012 | Avital | H04W 8/18 370/331 |
| 2012/0102217 | A1* | 4/2012 | Cardona | G06F 9/45558 709/235 |
| 2013/0179505 | A1 | 7/2013 | Cardona et al. | |
| 2013/0288674 | A1* | 10/2013 | Gassend | H04W 76/045 455/434 |
| 2014/0107919 | A1* | 4/2014 | Venkatraman | G01S 19/48 701/466 |

OTHER PUBLICATIONS

Written opinion of the International Searching Authority in International Application No. PCT/IB2013/059702, dated Jul. 28, 2014.

\* cited by examiner

METHODS AND SYSTEMS FOR TRANSMITTING AND RECEIVING DATA

TECHNICAL FIELD

The present invention relates in general to the field of computer networks. More particularly, the present invention relates to configuring each network adapter of a group of network adapters to use a communication technology corresponding to the each network adapter. Each network adapter uses its corresponding communication technology for transmitting and/or receiving data.

BACKGROUND ART

Network performance of one wireless technology can be very different from other wireless technologies. For example, the theoretical maximum data throughput of Long Term Evolution (LTE) is significantly higher than the theoretical maximum data throughput of Third Generation (3G). Therefore, it is preferred to use LTE when LTE is available. However, it is well known that network quality in wireless communication channels can be vastly different from one second to another second. Most wireless communication service providers and wireless communication devices allow wireless communication devices to change the use of wireless technologies depending on the network availability, signal strength, signal quality, network capacity and other metrics. It is desirable to restrict a wireless communication device to use one particular wireless technology only, regardless of the network availability, signal strength, signal quality, network capacity of the particular wireless technology.

It is well-known to those who are skilled in the art that state-of-art wireless communication devices allow the wireless communication devices to be configured to use one particular wireless technology. However, state-of-art wireless communication devices do not allow using two or more network adapters to transmit data, receive data and/or communicate with wireless access networks through the two or more network adapters simultaneously. Furthermore, state-of-art wireless communication devices do not take into the account that each network adapter may be different and/or the access network that each network adapter connects to may be different.

Furthermore, state-of-art wireless communication devices do not take into the account when data belonging to one session are distributed among a plurality of network adapters, which are using wireless communication technologies. Packet loss or packet drop experienced by one network adapter may materially affect the overall performance of the one session. For example, a wireless communication device may distribute data belonging to a TCP session using a plurality of network adapters. When there is a packet drop experienced in a connection used by a network adapter, other data after the dropped data packet may also be considered lost or dropped, due to the design of TCP, even if those other data have successfully arrived at the other side.

Network adapters may use a default communication technology and choose an access network depending on factors including signal strength, signal quality, network capacity. Alternatively, network adapters choose an access network only based on these factors, and there is no default communication technology. In some cases, based on these factors, the multiple network adapters of a network device use the same access network, and the disadvantages of this are illustrated in an example. For example, a first network adapter and a second network adapter use LTE technology, and they establish a first and second end-to-end connection respectively using a first LTE network. The first and second end-to-end connections are bonded to form an aggregated connection. Firstly, if the performance of the first LTE network is not satisfactory, for example the packet drop rate is high, the packet drop rate is high in both the first and the second end-to-end connections. Therefore, the overall performance of the aggregated end-to-end connection may be unsatisfactory when the same access network with unsatisfactory performance is used in both individual end-to-end connections. Secondly, the performance may further be deteriorated due to interference and sharing of the total bandwidth caused by the two end-to-end connections using the first LTE network.

DISCLOSURE OF INVENTION

Summary of Invention

According to one of the embodiments of the present invention, a network device uses a first group of network adapters to transmit and/or receive the data. The at least one network adapter is capable of transmitting and/or receiving data using a plurality of communication technologies and belongs to a first group of network adapters. During transmitting and/or receiving, each of the first group of network adapters is restricted to use only one of the following communication technologies: Ethernet, IEEE 802.11, Wi-Fi, WiMax, High-Speed Packet Access technology (HSPA), HSPA+, Bluetooth, 3G, Long Term Evolution (LTE), GPRS. EDGE, GSM, CDMA, CDMA2000, W-CDMA, TD-CDMA, TD-SCDMA, WiBro, and UMTS. The at least one network adapter is configured to achieve this as most network adapters are by default being configured to transmit data with the best access network or one of access networks that are accessible. As there are myriads of network adapters from many manufacturers, a configuration to configure a network adapter may be very different from another configuration to configure another network adapter. According to one of the embodiments of the present invention, the at least one network adapter is configured when an end-to-end connection is established.

In one of the embodiments, when a plurality of network adapters are used by the network device, the plurality of network adapters are classified into several groups. There is at least one network adapter in a first group. When there are a plurality of network adapters in the first group, the network device transmits data through the plurality of network adapters in the first group according to one or more data distribution techniques.

According to one of the embodiments of the present invention, a first group of network adapter(s) is used for transmitting data and a second group of network adapter(s) is used for receiving data. In one variant, a network adapter can belong to both the first group and the second group of network adapters. As a result, the communication technology used at the network adapter(s) for transmitting data can be the same as or different from the communication technology used by the network adapter(s) for receiving data. When respective communication technologies are selected for the network adapter(s) used for transmitting data and for the network adapter(s) used for receiving data, the respective communication technologies are not changed during respective data transmission and data receiving. In one variant, the respective communication technologies can be changed after completion of respective data transmission and data receiving.

In one of the embodiments of the present invention, the communication technology corresponding to a network adapter changes to another communication technology when a first condition is satisfied. For example, the first condition may be satisfied when an end-to-end connection is established through the network adapter. Alternatively, the first condition may be satisfied when the network device is being used at a specific geographical location.

In one of the embodiments, when a network adapter is configured to use a first communication technology, but cannot connect to an access network using the first communication technology, the network device stops using the network adapter for transmitting and/or receiving data, even if the network adapter is able to connect to an access connection using a second communication technology.

In one of the embodiments, a plurality of end-to-end connections are established through one or more network adapters, and the plurality of end-to-end connections are aggregated to form an aggregated end-to-end connection. Data is then transmitted and/or received through the aggregated end-to-end connection. Each of the network adapters establishing an end-to-end connection can use different communication technologies.

DETAILED DESCRIPTION

The ensuing description provides preferred exemplary embodiment(s) and exemplary embodiments only, and is not intended to limit the scope, applicability or configuration of the invention. Rather, the ensuing description of the preferred exemplary embodiment(s) and exemplary embodiments will provide those skilled in the art with an enabling description for implementing a preferred exemplary embodiment of the invention. It is understood that various changes may be made in the function and arrangement of elements without departing from the spirit and scope of the invention as set forth in the appended claims.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage medium, such as a secondary storage.

Moreover, as disclosed herein, the term "secondary storage" and "main memory" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data. A machine-readable medium can be realized by virtualization, and can be a virtual machine readable medium including a virtual machine readable medium in a cloud-based instance.

Furthermore, embodiments may be implemented by hardware, software, firmware, middleware, microcode, hardware description languages, or any combination thereof. When implemented in software, firmware, middleware or microcode, the program instructions or code segments to perform the necessary tasks may be stored in a machine readable medium such as storage medium. A processing unit(s) may perform the necessary tasks. A processing unit(s) can be a CPU, an ASIC semiconductor chip, a semi-conductor chip, a logical unit, a digital processor, an analog processor, a FPGA or any processor that is capable of performing logical and arithmetic functions. A program instruction may represent a procedure, a function, a subprogram, a program, a routine, a subroutine, a module, a software package, a class, or any combination of instructions, data structures, or program statements. A program instruction may be coupled to another program instruction or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. A processing unit(s) can be realized by virtualization, and can be a virtual processing unit(s) including a virtual processing unit in a cloud-based instance.

A network adapter may be implemented by a standalone electronic component or may be integrated with other electronic components. A network adapter may have no network connection or at least one network connection depending on the configuration. A network adapter is only connected to one access network. Therefore, there may be more than one network connection being carried by one access network. A network adapter may be an Ethernet adapter, a frame relay adapter, a fibre optic adapter, a cable adapter, a DSL adapter, a token ring adapter, a serial bus adapter, a universal serial bus (USB) adapter, Firewire adapter. Peripheral Component Interconnect (PCI) adapter, etc. A network adapter may be housed inside a network device, or may be housed outside the network device.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, LAN, MAN, WAN, the PSTN, a satellite communication system, a cable transmission system, and/or the like.

An access network may carry one or more network protocol data. A access network may be a wired network or a wireless network. A wired access network may be implemented using Ethernet, fiber optic, cable, DSL, frame relay, token ring, serial bus, USB, Firewire. PCI, or any material that can pass information. A wireless access network may be implemented using infra-red, High-Speed Packet Access (HSPA), HSPA+. Long Term Evolution (LTE), WiMax. General Packet Radio Service (GPRS). Enhanced Data Rates for GSM Evolution (EDGE), Global System for Mobile Communications (GSM), Code Division Multiple Access (CDMA), Wi-Fi, IEEE 802.11, Third Generation (3G), CDMA2000. Wideband CDMA (W-CDMA), Time-division-CDMA (TD-CDMA), Time Division Synchronous CDMA (TD-SCDMA), Bluetooth, WiBRO, Universal Mobile Telecommunications System (UMTS) or any other wireless technologies.

FIG. 1 is an illustrative block diagram of a network device, such as network device 101, according to one of the embodiments of the present invention. Network device 101 comprises processing unit 102, main memory 103, system bus 104, secondary storage 105, and a plurality of network adapters, namely network adapters 106, 107 and 108. In one variant, among the plurality of network adapters, a first group of network adapters are selected for transmitting and/or receiving data. The first group of network adapters may comprise one or more network adapters. Processing unit 102 and main memory 103 are connected to each other directly. System bus 104 connects processing unit 102 directly or indirectly to secondary storage 105, and network adapters 106, 107 and 108. Using system bus 104 allows network device 101 to have increased modularity. System bus 104 couples processing unit 102 to secondary storage 105, and network adapters 106, 107, and 108. System bus 104 can be any of several types of bus structures including a memory bus, a peripheral bus, and a local bus using any of a variety of bus architectures. Secondary storage 105 stores program instructions for execution by processing unit 102. Secondary storage 105 further stores configurations corresponding to each of network adapters 106, 107, and 108, and also conditions for selecting the first group of network adapters among network adapters 106, 107, and 108. Network adapters 106, 107 and 108 are capable of using a plurality of communication technologies. However, each of network adapters 106, 107, and 108 are restricted to using a specific communication technology by a configuration according to one of the embodiments. The scope of the invention is not limited to network device 101 having three network adapters, such that network device 101 may have one or more network adapters. Network adapters 106, 107 and 108 specified for illustration purposes only.

The plurality of communication technologies, that the network adapters 106, 107, and 108 are capable of using, include one or more of Ethernet, IEEE 802.11, Wi-Fi, WiMax, HSPA, HSPA+, Bluetooth, 3G, LTE, GSM. GPRS, EDGE, CDMA, CDMA2000, W-CDMA. TD-CDMA, TD-SCDMA. WiBro, UMTS or the like. Each of network adapters 106, 107 and 108 can be restricted to use any of the plurality of communication technologies. For example, when a network adapter 106 is using IEEE 802.11 technology, it can be configured to use only one of IEEE 802.11a, 802.11b, 802.11g, 802.11ac, 802.11ad or 802.11n, even though the network adapter is capable of using all of the technologies. Network adapter 106 can also be configured to use only 802.11n/a or 802.11n/g technology. In another example, when network adapter 107 is using cellular technology, it can be configured to use only CDMA, even though it is capable of using Wi-Fi, WiMax, HSPA, HSPA+, 3G, LTE, GPRS, EDGE, GSM, CDMA, CDMA2000. W-CDMA, TD-SCDMA, WiBro, and UMTS.

According to one of the embodiments, network device 101 stores corresponding configuration(s) for at least one of network adapters 106, 107, and 108 in secondary storage 105. The corresponding configuration(s) is/are retrieved by processing unit 102 from secondary storage 105. Processing unit 102 configures each of the at least one of network adapter 106, 107, and 108 according to its corresponding configuration. Data is transmitted through at least one of network adapters 106, 107, and 108 according to its corresponding configuration(s). In one variant, the user or administrator of network device 101 may manually choose which network adapter(s) should be used for transmitting and/or receiving data and configure the chosen network adapter(s) according to their corresponding configuration(s). Data is then transmitted through the chosen network adapter(s). Alternatively, processing unit 102 chooses network adapter(s) for transmitting and/or receiving data based on predefined policies and/or conditions. The process of determining whether a network adapter is chosen or not is illustrated in detail in FIG. 3.

In one variant, the at least one network adapter is further used for receiving data according to its corresponding configuration. Alternatively, processing unit 102 uses another at least one network adapter for receiving data and configures the another at least one network adapter according to its corresponding configuration. Hence, network device 101 uses a first group and a second group of network adapters for transmitting data and receiving data respectively. A network adapter can belong to both groups of network adapters when it is used for both transmitting and receiving data. Therefore, the first group and the second group of network adapters may or may not comprise the same network adapters. The benefits of having a first group and a second group of network adapters for transmitting and receiving data respectively include facilitation of using different communication technologies for transmitting and receiving and may result in asymmetric upload and download speeds. For example, when download performance is more important than upload performance, a communication technology that can provide better performance is used for download, and another communication technology is used for upload.

Configuration corresponding to a network adapter, such as network adapter 106, is to make network adapter 106 use one specific communication technology for transmitting and/or receiving data. It is desirable to restrict network adapter 106 to use the specific communication technology in certain scenarios, because different communication technologies may provide different network performances. The specific communication technology is preferably Long Term Evolution (LTE). It is known to those of ordinary skill in the art that LTE provides better performance than most other communication technologies for wireless access networks in general. For example, the theoretical peak speed for download provided by LTE is considerably higher than that provided by 3G. Therefore, network adapter 106 is configured to use LTE whenever there is an accessible and stable LTE network. An access network is considered to be stable when the signal strength satisfies a certain threshold, because otherwise, the connection may get disconnected too frequently due to sudden rise in noise or interference. In some scenarios, an access network may become unstable due to bandwidth caps set by the network service provider, bandwidth throttling, rate-limiting, or the like. In one variant, when the LTE network is not available or is not stable, network adapter 106 does not switch to any other communication technologies and is not used to transmit and/or receive data. The configuration is such, that even when the network availability, signal strength, network capacity, or the like are better for an access network using another communication technology, such as a 3G network, network adapter 106 continues using the LTE network. Therefore, network adapter 106 does not switch between communication technologies frequently. In one variant, if the LTE network becomes unstable, network device 101 stops using network adapter 106 and uses another network adapter, such as network adapter 107, for transmitting and/or receiving data according to the configuration of network adapter 107.

In one of the embodiments of the present invention, the specific communication technology is selected by processing unit 102 based on one or more criteria including data type, traffic pattern, port number, application, and protocol. For example, data type of data to be transmitted through network adapter 106 can be determined through deep packet inspection, and based on the data type, a communication technology is specified for network adapter 106. Certain communication technologies may be suitable for certain types of data. For illustration purposes, a network adapter may be configured such that when the network adapter is using port 21 for a FTP session, the network adapter starts using IEEE 802.11 technology for transmitting and/or receiving data belonging to the FTP session. Alternatively, in another example, when a network adapter is using port 80 for video conferencing, the network adapter's configuration allows it to use LTE technology for transmitting and/or receiving data.

FIG. 2 illustrates a process of configuring a network adapter, such as network adapter 106, according to one of the embodiments. In step 201, configuration corresponding to network adapter 106 is retrieved by processing unit 102. The configuration may be retrieved locally from secondary storage 105 or remotely from a remote server and is received through a web interface, an application programming interface (API), a command line interface or a console. In step 202, processing unit 102 determines a corresponding communication technology for network adapter 106 according to the corresponding configuration retrieved in step 201. Data is transmitted and/or received through network adapter 106 using the corresponding communication technology in step 203. In one variant, network adapter 106 is only used for transmitting data and another network adapter, such as network adapter 107, is configured according to the process of FIG. 2 for receiving data. Therefore, in step 203, data is received through network adapter 107, according to its corresponding configuration, using a corresponding communication technology.

At least one of network adapters 106, 107, and 108 is configured with its corresponding configuration according to FIG. 2, wherein the corresponding configuration is stored in secondary storage 105 according to one of the embodiments. The communication technology that a network adapter uses is restricted by the network adapter's corresponding configuration. For example, processing unit 102 determines that a network adapter 106 has corresponding configuration to use LTE technology to transmit and/or receive data in step 202. When network adapter 106 is configured with the corresponding configuration, the network adapter 106 is restricted to use LTE technology to transmit and/or receive data, even when access networks using other communication technologies are available. A user or administrator of network device 101 can configure network adapters 106, 107, and 108 with configurations according to their preference. The user or administrator can access network device 101 through a connection and input the configuration(s) remotely or locally through a web interface, command line interface, and/or application programming interface (API). Once the configuration is inputted remotely or locally through the web interface, command line interface and/or API, the configuration can be stored locally in secondary storage 105 or in a remote server for retrieval by processing unit 102 while configuring network adapters 106, 107, and 108 with their corresponding configurations.

For illustration purposes, configurations are based on AT commands. Network adapters manufactured by most companies can accept AT commands which are used to configure the network adapters to use a specific communication technology. However the commands are different for different brands of network adapters.

In one of the embodiments, a modem from ZTE Technologies is used as network adapter 106. When a user or administrator configures network adapter 106 to use only 3G for transmitting and/or receiving data, the configuration is "AT+ZSNT=2,0,0". Alternatively, when a modem from Sierra Wireless is used as network adapter 106, the configuration for configuring network adapter 106 to use only 3G for transmitting and/or receiving data is "AT!SELRAT=1".

In another embodiment, the configuration of network adapter 106, which is a modem from ZTE technologies, for configuring it to use only LTE for transmitting and/or receiving is "AT+ZSNT=6,0,0". Alternatively, for example network adapter 107 is a modem from Sierra Wireless. The configuration used for configuring network adapter 107 to use LTE for transmitting and/or receiving data, the AT command in the configuration is "AT!SELRAT=6".

The scope of the embodiments should not be restricted to configuration using AT commands in the configuration. The user or administrator can set configuration to configure the network adapter(s) according to the configuration and according to the brand of the network adapter.

In one of the embodiments, network adapter 106, using Wi-Fi, is configured with configuration that restricts network adapter 106 to use a Wi-Fi network with one of IEEE 802.11a, 802.11b, 802.11n, 802.11ac, 802.11ad, or 802.11g technology. For example, a user configures network adapter 106 with its corresponding configuration that restricts it to use only 802.11n technology when the user wants to connect to a Wi-Fi network. Therefore, even if a first Wi-Fi network using 802.11a is available and has better signal strength, network adapter 106 uses a second Wi-Fi network using 802.11n if the second Wi-Fi network is available. If the second Wi-Fi network using 802.11n is not available or is not stable, network adapter 106 uses the first Wi-Fi network using 802.11a. In some scenarios, 802.11n technology provides better network speed than 802.11a technology. Therefore, it is beneficial to restrict network adapter 106 to use a Wi-Fi network using 802.11n so that it doesn't switch between different communication technologies frequently, and hence performance deterioration is avoided. Alternatively, when the second Wi-Fi network is not available or is unstable, network device 101 stops using network adapter 106 for transmitting and/or receiving data, and starts using network adapter 107 for transmitting and/or receiving data according to the corresponding configuration of network adapter 107. Therefore data transmission and/or receiving is not paused till network adapter 106 connects to the second Wi-Fi network or until network adapter 106 finds another Wi-Fi network using 802.11n technology. In one variant, a configuration file is stored in secondary storage 105 and is used to configure network adapters 106 and 107 to use one of the IEEE 802.11 protocols.

In another example, when network adapter 106 is configured to use only 802.11n/g for transmitting and/or receiving data, the configuration is "#iwpriv ath0 mode 11nght20", where ath0 is the name of network adapter 106. 802.11n/g uses a frequency of 2.4 GHz range. In some scenarios, using the 2.4 GHz range provides better network coverage and is more economically viable. Alternatively, when network adapter 106 is configured to use only 802.11n/a for transmitting and/or receiving data, the configuration is "#iwpriv ath0 mode 11naht20". 802.11n/a uses a frequency of 5 GHz range. In some scenarios, the 5 GHz range provides lesser network interference compared to the 2.4 GHz range because very few wireless home or office appliances use the 5 GHz range. However, the network coverage may be less in the 5 GHz range compared to the 2.4 GHz range.

In one of the embodiments, a mobile phone, a tablet, or a similar handheld device that is capable of using various wireless communication technologies can be configured to use one specific communication technology only. Mobile phones and tablets are now widely used for applications requiring internet access through high performance and/or low cost access networks, and therefore it is desirable to be able to configure the mobile phones or tablets to use a specific communication technology only. For example, in one variant, an application is installed in a mobile phone for restricting the mobile phone to use a specific communication technology. For example, a user of the mobile phone uses the application for configuring the mobile phone to use LTE technology for transmitting and/or receiving data by clicking on a specific icon or button. By clicking on another specific icon or button, the user can use the application for configuring the mobile phone to use another communication technology for transmitting and/or receiving data. Alternatively, the mobile phone can be configured by sending commands from a desktop computer to the mobile phone application. The commands can be sent to a listener application, via a network connection, or via a physical cable. The application and the commands used depend, at least in part, on the operating system of the mobile phone, such as Android OS, iOS, Windows OS.

In one of the embodiments, the network adapters are configured according to their corresponding configuration during initialization of the respective network adapters. Initialization of a network adapter may occur in various stages including powering up network device 101, choosing the network adapter, specifying the port address of the network adapter, assigning an Internet Protocol (IP) address to the network adapter and activating the network adapter for transmitting and/or receiving data. Configuration of the network adapter can be performed during any of the initialization stages. For illustration purpose, while network adapter 106 is being initialized, processing unit 102 retrieves configuration corresponding to network adapter 106 from secondary storage 105 and configures network adapter 106 with the corresponding configuration. In this case, network adapter 106 is configured even if there is no data transfer session going on. In another example, network adapter 106 is configured when establishing a data transfer session or during initializing a connection through network adapter 106. i.e. during handshaking. Therefore, network adapter 106 is only configured when network device 101 determines to use network adapter 106 for data transfer.

Alternatively, the network adapters are configured according to their corresponding configurations during transmission of data through the respective network adapters. However, configuring during transmission of data is not preferred because configuring will be performed before each data packet is transmitted, and therefore the change in configuration might be too frequent. This causes the performance to deteriorate.

Alternatively, the network adapters are configured according to their corresponding configurations during establishment of end-to-end connections through the respective network adapters. Before the establishment of the end-to-end connection(s), the network adapter uses a default communication technology to transmit and/or receive data. The default communication technology can be set by the user or administrator of network device 101. An end-to-end connection is a connection between network device 101 and another network device. An end-to-end connection may include one or more communication links and one or more intermediate nodes. The end-to-end connection can be implemented by using connection oriented networking technology or connectionless-oriented networking technology. The end-to-end connection can therefore be implemented by using Transmission Control Protocol (TCP/IP), User Datagram Protocol (UDP/IP), IPSec and/or other Virtual Private Network (VPN) technologies. For example, network device 101 establishes an end-to-end connection, such as a VPN connection, through network adapter 106. When entering parameters for configuring and establishing the VPN connection, the user or administrator also configures network adapter 106 to use a specific communication technology for transmitting and/or receiving data through the VPN connection.

In one variant, multiple end-to-end connections established through one or more network adapters are bonded together to form an aggregated end-to-end connection. When multiple end-to-end connections are established through more than one network adapters of network device 101, the more than one network adapters may use the same or different communication technologies for transmitting and/or receiving data.

In one of the embodiments, the data may comprise packets or frames carrying information. Alternatively, the data comprises encapsulating packets that encapsulate packets or frames carrying information. The encapsulating packets encapsulate the packets or frames before the encapsulating packets are transmitted through end-to-end connection(s) established through at least one of network adapters 106, 107, and 108. The packets or frames may originate from network device 101 and/or from host(s) and/or node(s) connecting to network device 101. The end-to-end connections established can be bonded to form an aggregated end-to-end connection. Using an aggregated end-to-end connection may result in higher bandwidth which is a combined bandwidth of the individual end-to-end connections. The aggregated end-to-end connection is perceived as one end-to-end connection by sessions or applications that are using it. Alternatively, the data is comprised in encapsulating packets for various other reasons such as data security or data routing.

In one of the embodiments, when multiple end-to-end connections, for example, a first, second and third end-to-end connections, are established through network adapters 106, 107, and 108 respectively, network adapters 106, 107, and 108 are configured to use different communication technologies. The first, second and third end-to-end connections are bonded to form an aggregated end-to-end connection. When the communication technology used through each of network adapters 106, 107, and 108 is different, the overall performance of the aggregated end-to-end connection may not significantly deteriorate when performance of one of the end-to-end connections becomes unsatisfactory. For example, network adapter 106 is configured to use LTE and network adapter 107 is configured to use 3G. Thus, the interference between the first end-to-end connection and the second end-to-end connection may be reduced and dedicated bandwidth for each end-to-end connection may be higher, compared to a scenario where both network adapters 106 and 107 use the same communication technology according to prior art. The data transfer session through the aggregated end-to-end connection is smoother than that in prior art because, if the performance of the first end-to-end connection using a LTE network becomes unsatisfactory for some time, network device 101 can rely on the second end-to-end connection using a 3G network for transferring data, or vice versa.

In one of the embodiments, a network adapter's corresponding configuration changes when a first condition is satisfied. For example, a first configuration can be used to restrict network adapter 106 to use a first communication technology, and a second configuration can be used to restrict network adapter 106 to use a second communication technology. Network adapter 106 is configured with the first configuration when the first condition is not satisfied, and therefore network adapter 106 uses the first communication technology to transmit and/or receive data. When the first condition is satisfied, network adapter 106 is configured with the second configuration, and therefore network adapter 106 uses the second communication technology. For illustration purposes, a first condition is satisfied when an end-to-end connection is established through network adapter 106. Therefore, when an end-to-end connection is established through network adapter 106, network adapter 106 is configured with the second configuration that allows it to use LTE technology. Alternatively, when there is no end-to-end connection established through network adapter 106, network adapter 106 is configured with the first configuration that causes it to use IEEE 802.11 technology.

In one of the embodiments, the first condition may or may not apply to all network adapters being used for transmitting and/or receiving data. When the first condition does apply to other network adapters being used for transmitting and/or receiving data, each network adapter can be configured to use specific communication technologies when the first condition is satisfied or when the first condition is not satisfied. For example, network adapters 106 and 107 are selected by processing unit 102 for transmitting and/or receiving data, and the first condition applies to both network adapters 106 and 107. The first condition is satisfied when an end-to-end connection is established. Network adapter 106 is configured to use LTE technology when an end-to-end connection is established through network adapter 106, and IEEE 802.11 technology when an end-to-end connection is not established through network adapter 106. On the other hand, network adapter 107 is configured to use 3G technology when an end-to-end connection is established through network adapter 107, and Bluetooth technology when an end-to-end connection is not established through network adapter 107.

FIG. 5 is a flowchart illustrating a process of using a communication technology for transmitting and/or receiving data according to one of the embodiments of the present invention. Network adapter 106 is configured according to its corresponding configuration in step 501. In step 502, processing unit 102 determines whether a first condition is satisfied. If the first condition is not satisfied, a first communication technology is used for transmitting and/or receiving data through network adapter 106 in step 503. If the first condition is satisfied, a second communication technology is used for transmitting and/or receiving data through network adapter 106 in step 504.

In one of the embodiments, viewing in conjunction with FIG. 5, network device 101 establishes an end-to-end connection with another network device through network adapter 106. The first condition in step 502 is satisfied if an end-to-end connection is established through network adapter 106. The first condition is not satisfied if an end-to-end connection is not established through network adapter 106. Network adapter 106 is configured with a configuration that restricts it to using a first communication technology when an end-to-end connection is not established, and restricts it to use a second communication technology when an end-to-end connection is established through network adapter 106, as illustrated in FIG. 5. The end-to-end connection may be a VPN connection. For example, the first communication technology is W-CDMA, and the second communication technology is LTE. Network adapter 106 is configured with a corresponding configuration in step 501. The corresponding configuration restricts network adapter 106 to use W-CDMA to transmit and/or receive data when there is no end-to-end connection. Therefore, when processing unit 102 determines in step 502 that an end-to-end connection is not established, data is transmitted and/or received through network adapter 106 using W-CDMA in step 503. Then, when processing unit 102 decides to establish an end-to-end connection through network adapter 106, the corresponding configuration restricts network adapter 106 to use LTE when data is transmitted and/or received through the end-to-end connection in step 504. This facilitates using a specific communication technology, like LTE, for an end-to-end connection and another communication technology, like W-CDMA, for all other purposes. When the user or administrator establishes an end-to-end connection, such as a VPN connection, it would be desirable that the access network of the end-to-end connection is highly reliable and fast, as VPN connections are widely used to connect geographically disparate offices of organizations to be securely connected to each other. For example, in a certain geographical region, using LTE technology to transmit and/or receive data through network adapter 106 ensures that the end-to-end connection is more reliable and faster compared to using most other communication technologies. Thus, when network adapter 106 does not establish an end-to-end connection, and the user or administrator does not need the connection to be fast, it could be more economically viable to use W-CDMA instead of LTE because using LTE technology is more expensive than using W-CDMA. However, while switching back to W-CDMA when network adapter 106 disconnects the end-to-end connection, initializing the W-CDMA network may cause a delay.

In one of the embodiments, viewing in conjunction with FIG. 5, the first condition is satisfied when network device 101 is being used in a certain geographical location, such as New York. The first condition is not satisfied when network device 101 is being used in any location other than New York. Therefore, in step 501, network adapter 106 is configured with configuration that restricts it to use a first communication technology when network device 101 is used outside New York, and restricts it to use a second communication technology when network device 101 is used inside New York. For example, the first communication technology is IEEE 802.11 and the second communication technology is LTE. In step 502, processing unit 102 determines the geographical location of network device 101. If network device 101 is not in New York, network adapter 106 uses IEEE 802.11 technology and connects to an accessible Wi-Fi network for transmitting and/or receiving data in step 503. If network device 101 is being used in New York, network adapter uses LTE technology and connects to an accessible LTE network for transmitting and/or receiving data in step 504. In one variant, a group of geographical locations are defined. The first condition is satisfied if network device 101 is in any one of the group of geographical locations. For example, the group of geographical locations includes New York and San Francisco. Therefore, when network device 101 is in New York or San Francisco, the first condition is satisfied, and network adapter 106 uses LTE.

In one of the embodiments of the present invention, a network adapter is configured to use Bluetooth version 3.0 or above. In Bluetooth 3.0 specification, a low speed connection is used by the network adapter until high speed is required for data transfer. When a high speed data transfer is required, the network adapter switches to using a high speed connection that utilizes IEEE 802.11 technology. In this case, although the network adapter is configured to use Bluetooth, it is allowed to switch to IEEE 802.11 when required. Therefore the network adapter is not restricted to use Bluetooth by its configuration.

FIG. 4 illustrates network adapters of a network device, such as network device 101, according to one of the embodiments. Network device 101 comprises network adapters 411, 412, 413, 414, 415, and 416. A first group of network adapters is selected from network adapters 411, 412, 413, 414, 415, and 416 and data is transmitted through the first group of network adapters. The first group of network adapters is selected according to at least one condition. In one of the embodiments, a second group of network adapters is selected from network adapters 411, 412, 413, 414, 415, and 416 and data is received through the second group of network adapters. The second group of network adapters is selected according to at least one condition. The first group of network adapters and the second group of network adapters may or may not comprise the same network adapters. Network device 101 transmits data through the first group of network adapters according to one or more data distribution techniques. Network adapters 411, 412, 413, 414, 415 and 416 network adapters 106, 107, and 108 according to one of the embodiments.

In one of the embodiments, network adapters 411, 412 and 413 belong to a first group of network adapters, and network adapters 414, 415 and 416 belong to a second group of network adapters. When network adapter 411 is configured to use a first communication technology for transmitting and/or receiving data, but an access network using the first communication technology is not accessible through network adapter 411, then network adapter 412 is used for transmitting and/or receiving data. Network adapter 412 is also configured to use the first communication technology and an access network using the first communication technology is accessible through network adapter 412. This ensures that network device 101 is using the first communication technology through at least one of its network adapters for transmitting and/or receiving data. Therefore, network device 101 continues using the same communication technology to transmit and/or receive data, even though it is using a different network adapter. This is beneficial because, in some cases, the initialization time required when switching from one communication technology to another communication technology is significantly high, and thus the performance of network device 101 will be affected negatively. On the contrary, switching from network adapter 411 to network adapter 412 might not affect the performance of network device 101 so adversely. Furthermore, some communication technologies provide better performance compared to other communication technologies in certain environments, and therefore it is desirable that network device 101 continues to use the first communication technology even if a different network adapter is used.

In an example, for illustration purpose, network adapter 411 and network adapter 412 is capable of using a plurality of communication technologies. Network adapters 411 and 412 are configured to use LTE. Network device 101 transmits data through network adapter 411 using a first LTE network. When network adapter 411 reports at least one error that causes it to be disconnected from the first LTE network, network device 101 starts transmitting data through network adapter 412 using the first LTE network or a second LTE network.

In another example, a Wi-Fi network is available for network adapter 411 to connect to. Since network adapter 411 is configured to use LTE, network adapter 411 does not use the Wi-Fi network to transmit data even when the Wi-Fi network is accessible through network adapter 411. The benefit of restricting network adapter 411 to using LTE networks is that in most cases, LTE provides higher network coverage, lower interference, higher speed, and better network performance compared to Wi-Fi in general. In many scenarios. Wi-Fi networks have small coverage and the interference is significantly high when compared to LTE networks.

Alternatively, when an access network using the first communication technology is not accessible through network adapter 411, network device 101 uses network adapter 414 belonging to the second group of network adapters for transmitting and/or receiving data according to the configuration of network adapter 414. This is beneficial because it is likely that when an access network using the first communication technology is not accessible through one network adapter of a network device, the access network using the first communication technology is also not accessible through other network adapters of the network device. Therefore, when an access network using the first communication technology is not accessible through network adapter 411, network device 101 does not waste time searching for another network adapter which can connect to an access network using the first communication technology. Network device 101 instead starts using network adapter 414 that is configured to use another communication technology. Therefore, when network adapter 411 reports to processing unit 102 that the LTE network is unavailable or is unstable, network device 101 does not use network adapter 412 to connect to the same LTE network. Network adapter 414 is used to connect to a different LTE network or a 3G network, or a Wi-Fi network according to the configuration of network adapter 412.

In one of the embodiments of the present invention, network adapters 411, 412, 413, 414, 415, and 416 can be grouped into one or more groups according to a classification, or manual grouping by the user of network device 101. In one example, network adapters 411, 412, and 413 are grouped into a first group of network adapters. Similarly, network adapters 414, 415 and 416 are grouped into a second group of network adapters. In some embodiments, the first group of network adapters comprises primary network adapters and the second group of network adapters comprises secondary network adapters. Therefore network adapters 414, 415, and 416 are secondary network adapters corresponding to network adapters 411, 412 and 413 respectively. If one or more of network adapter 411, 412 or 413 fails, network device 101 starts using network adapter 414, 415, or 416 respectively. In another embodiment, network adapters 411 and 414 are grouped into a first group of network adapters. Similarly, network adapters 412 and 415 are grouped into a second group of network adapters, and network adapters 413 and 416 are grouped into a third group of network adapters. Alternatively, network adapters 411, 412, 413, 414, 415 and 416 can be grouped into many groups by classification according to the user's preferences. Classification can be conducted based on whether or not certain conditions are satisfied by the network adapters, wherein the conditions are selected from a group consisting of network connectivity, performance metric, service provider metric, location metric, time metric, price metric, security metric, user metric, Internet Protocol address metric, communication protocol metric, communication technology metric, application metric, device metric. The conditions can be retrieved locally from secondary storage 105 or remotely from a remote server.

Network adapters 411, 412, 413, 414, 415, and 416 are capable of using a plurality of communication technologies. In a preferred embodiment, the communication technologies are wireless communication technologies. Hence the hardware of the network adapters makes them capable of using the plurality of communication technologies.

In one of the embodiments, a network adapter can be identified by a globally unique identifier that could be used for authentication while connecting to a certain access network. The globally unique identifier, frequently termed an International Mobile Subscriber Identity (IMSI), is contained in a wireless identity module (WIM) such as a Subscriber Identity Module (SIM) card, a Universal Subscriber Identity Module (USIM), a smart-card, or any other type of electronic module that can contain a globally unique identifier and can be utilized by a network adapter.

FIG. 3 illustrates a process of selecting a first group of network adapters for transmitting data at a network device, such as network device 101, according to one of the embodiments. In step 301, processing unit 102 determines whether a first network adapter, such as network adapter 106, satisfies a first condition. Network adapter 106 is not selected to be in the first group of network adapters in step 304 if the first condition is not satisfied and the process of FIG. 3 is repeated for another network adapter, such as network adapter 107. If the first condition is satisfied by network adapter 106, network adapter 106 is selected to be in the first group of network adapters in step 302. In step 303, packets are transmitted and/or received through network adapter 106 because it belongs to the first group of network adapters. Similarly, the process of FIG. 3 is carried out for all of the network adapters of network device 101 to determine whether they can be selected to belong to the first group of network adapters. Network device 101 uses the first group of network adapters for transmitting and/or receiving data because the first group of network adapters satisfies the first condition. In one variant, more than one condition should be satisfied by a network adapter in order to be selected to belong to the first group of network adapters.

In one of the embodiments, network device 101 uses a first group and a second group of network adapters for transmitting and receiving data respectively. Processing unit 102 selects the first group and the second group of network adapters from the plurality of network adapters of network device 101 based on at least one condition. The at least one condition is selected from a group consisting of performance metric, service provider, location, time, usage price, security, user identity, Internet Protocol (IP) address range, communication protocol, communication technology, application, and device. The performance metric can be based on one or more of throughput, error rates, packet latency, packet jitter, symbol jitter, quality of service, bandwidth, bit error rate, packet error rate, frame error rate, dropped packet rate, queuing delay, round trip time, capacity, signal level, interference level, bandwidth delay product, handoff delay time, signal-to-interface ratio, and signal-to-noise ratio. The at least one condition is stored in secondary storage 105.

For example, viewing in conjunction with FIG. 3, the condition in step 301 is based on the dropped packet rate. If the dropped packet rate at network adapter 106 is equal to or more than a predefined threshold, the condition is not met, and network adapter 106 does not belong to the first group of network adapters. If the dropped packet rate is less than the predefined threshold, network adapter 106 belongs to the first group of network adapters and can be used to transmit data. Using conditions to select a first group and a second group of network adapters gives the user the benefit of being able to choose network adapters according to the user's preferences. Different users may have different preferences. Therefore, instead of the user choosing network adapters manually, processing unit 102 chooses network adapters automatically according to the user's preferences.

The first group and the second group of network adapters may or may not comprise the same network adapters. Network adapters are selected based on conditions set by the user or administrator of network device 101 according to their preference. For example, if the user wants to monitor costs, a condition for usage price is set.

Figure 1:
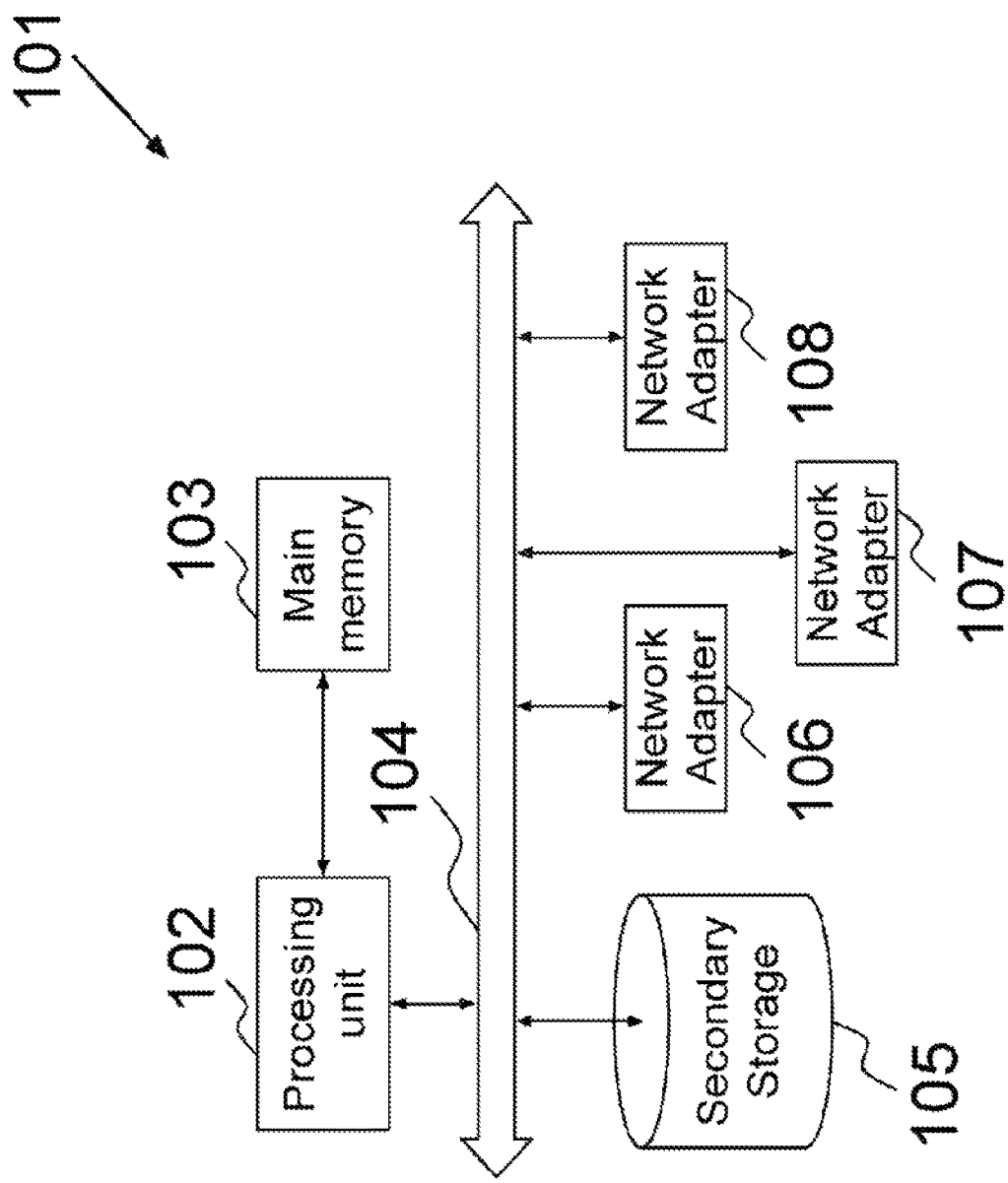
FIG. 1 is an illustrative block diagram of a network device according to one of the embodiments of the present invention.
Figure 2:
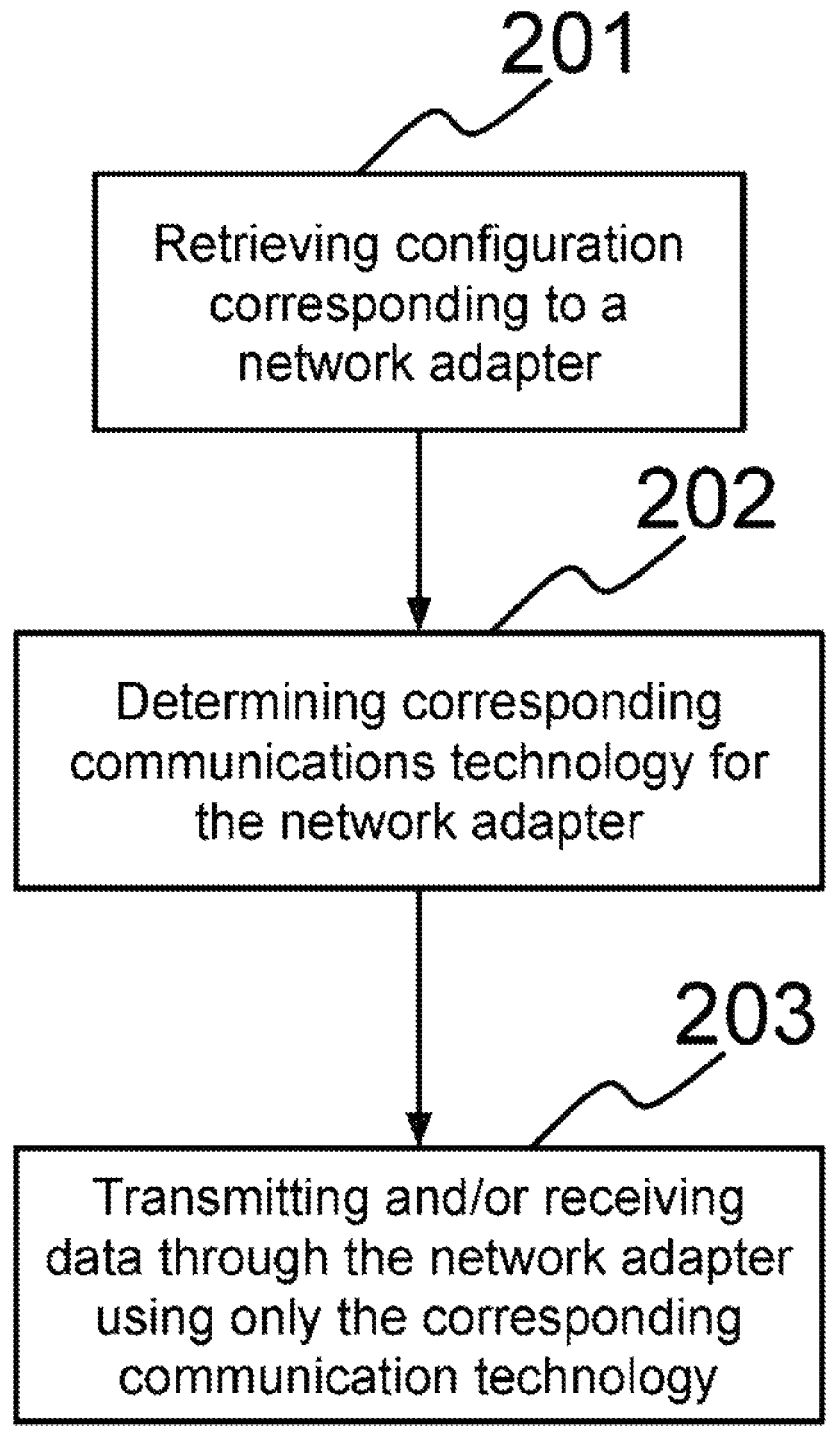
FIG. 2 illustrates a process of configuring a network adapter according to one of the embodiments.
Figure 3:
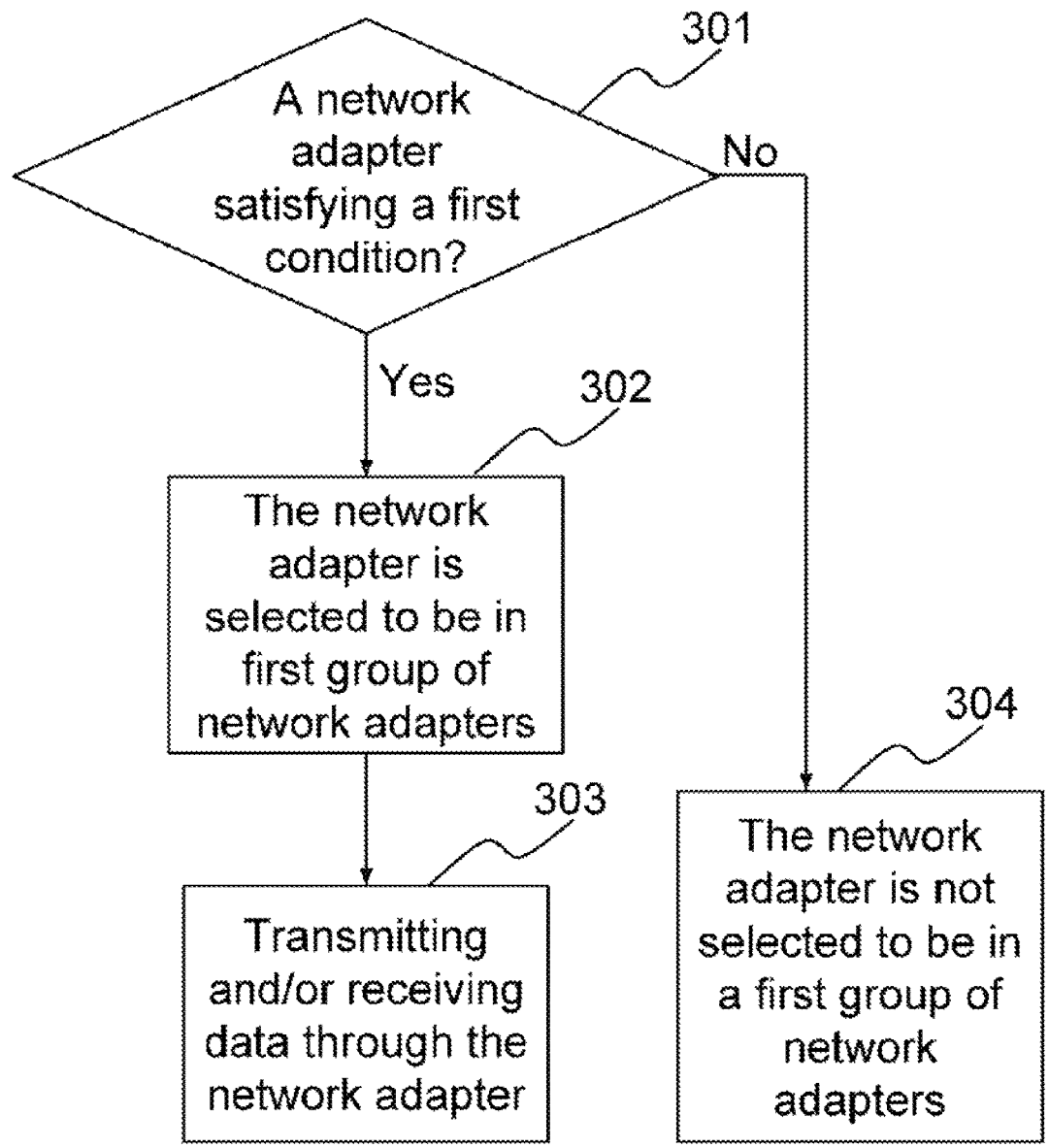
FIG. 3 illustrates a process of selecting a first group of network adapters for transmitting data at a network device according to one of the embodiments.
Figure 4:
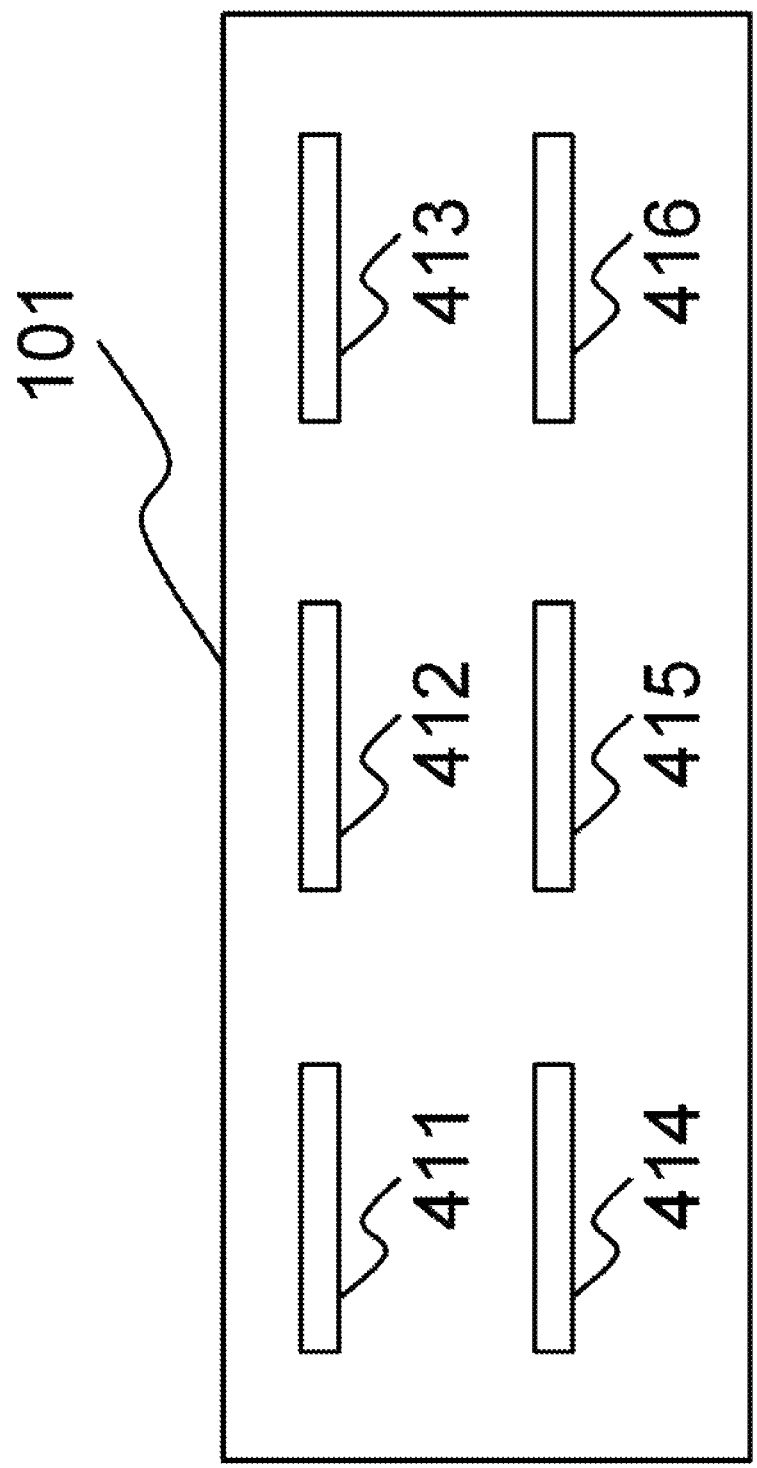
FIG. 4 illustrates network adapters of a network device according to one of the embodiments.
Figure 5:
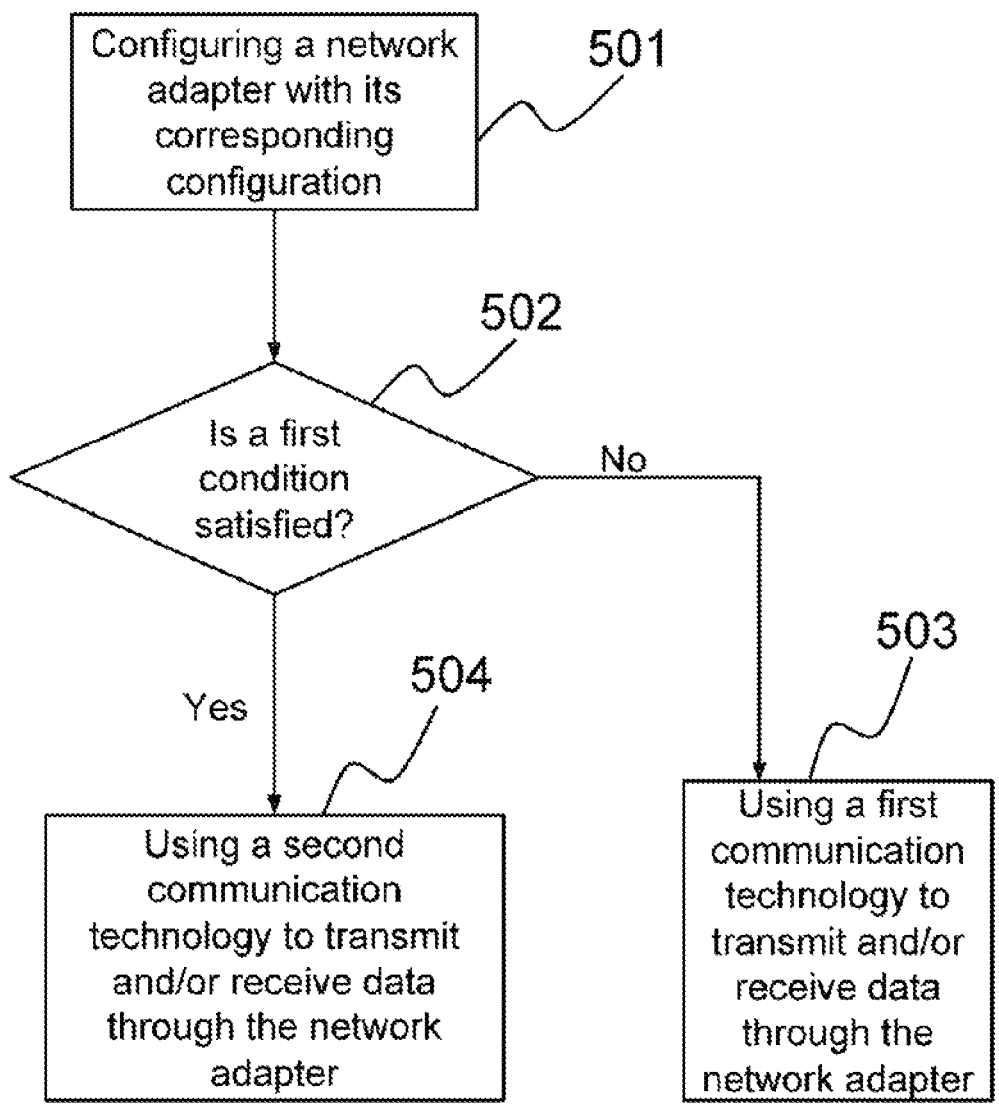
FIG. 5 is a flowchart illustrating a process of using a communication technology for transmitting and/or receiving data according to one of the embodiments of the present invention.

The invention claimed is:

1. A method of at least one of, transmitting and receiving data at a network device, the network device including a plurality of network adapters, the method comprising:
(a) classifying the plurality of network adapters into a first group of network adapters and a second group of network adapters according to a first condition; wherein the first group of network adapters comprises a first network adapter and the second group of network adapters comprises a second network adapter; wherein the first network adapter and the second network adapter are identified by a globally unique identifier; wherein the first condition is selected from a group consisting of performance metric, service provider, location, time, usage price, security, user identity, Internet Protocol (IP) address range, communication protocol, communication technology, application, and device;
(b) retrieving configuration corresponding to each of the plurality of network adapters; wherein the configuration comprises the globally unique identifier of each of the plurality of network adapters;
(c) determining a corresponding communication technology for each of the plurality of network adapters;

wherein the corresponding communication technology allows the each of the plurality of network adapters to connect to a corresponding access network; wherein the first network adapter and the second network adapter are first configured to use a first communication technology; wherein when the first network adapter and the second network adapter are restricted to use the first communication technology even when networks corresponding to other communication technologies are available;

(d) establishing end-to-end connections using at least two of the plurality of network adapters;

(e) if a second condition is satisfied: transmitting and receiving data through the first group of network adapters using the corresponding communications technology of each of the first group of network adapters; if the second condition is not satisfied: transmitting and receiving data through the second group of network adapters using a corresponding communications technology of each of the second group of network adapters; wherein the second condition is satisfied if at least one end-to-end connection is established through the first group of network adapters; wherein the data is transmitted and received through an aggregated end-to-end connection and wherein the aggregated end-to-end connection comprises a plurality of end-to-end connections established through at least one of the first group of network adapters;

(f) when an access network using the first communication technology is not accessible through the first network adapter: transmitting and receiving data through the second network adapter using the first communication technology instead of transmitting and receiving data through the first network adapter;

(g) when one of, the access network using the first communication technology becomes accessible again through the first network adapter, or the first network adapter connects to an another access network using the first communication technology, starting to use the first network adapter for transmitting and receiving data;

(h) when the first condition is based on location and the first condition is satisfied when the network device is used in a first location: restricting the network device to use a third communication technology when the network device is in the first geographical area; and restricting the network device to use the first communication technology when the network device is outside the first geographical area; wherein the first geographical location range has at least one network using the second communication technology;

wherein the each network adapter of the first group of network adapters is configured by a configuration corresponding to the each network adapter;

wherein when the data is latency sensitive, a communication technology with a low latency is selected as the first communication technology; and wherein the corresponding communication technology is a wireless communication technology.

2. The method of claim 1, wherein the first network adapter and the second network adapter use a default communication technology before establishing the end-to-end connection.

3. The method of claim 1, wherein the first network adapter is configured to use a second communication technology when no Virtual Private Network (VPN) connection is established through the first network adapter.

4. The method of claim 1, wherein the first group of network adapters comprises primary network adapters and the second group of network adapters comprises secondary network adapters.

5. The method of claim 1, wherein the end-to-end connections are implemented using one of, Transmission Control Protocol (TCP/IP), User Datagram Protocol (UDP/IP), IPSec or other Virtual Private Network (VPN) technologies.

6. The method of claim 1, wherein the performance metric is based on at least one of throughput, error rates, packet latency, packet jitter, symbol jitter, quality of service, bandwidth, bit error rate, packet error rate, frame error rate, dropped packet rate, queuing delay, round trip time, capacity, signal level, interference level, bandwidth delay product, handoff delay time, signal-to-interface ratio, and signal-to-noise ratio.

7. The method of claim 1, wherein the corresponding communication technology is selected according to at least one criterion; wherein the at least one criterion is selected from a group consisting of data type, traffic pattern, port number, application, and protocol.

8. The method of claim 1, wherein all of the first group of network adapters are configured to use the first communication technology.

9. The method of claim 1, wherein the first group of network adapters comprises a third network adapter; wherein the third network adapter uses the first communication technology for transmitting data and a second communication technology for receiving data.

10. A network device configured to at least one of, transmit and receive data, the network device comprising a
    plurality of network adapters;
    at least one processing unit;
    at least one main memory;
    at least one secondary storage storing program instructions executable by the at least one processing unit for:
    (a) classifying the plurality of network adapters into a first group of network adapters and a second group of network adapters according to a first condition; wherein the first group of network adapters comprises a first network adapter and the second group of network adapters comprises a second network adapter; wherein the first network adapter and the second network adapter are identified by a globally unique identifier; wherein the first condition is selected from a group consisting of performance metric, service provider, location, time, usage price, security, user identity, Internet Protocol (IP) address range, communication protocol, communication technology, application, and device;
    (b) retrieving configuration corresponding to each of the plurality of network adapters; wherein the configuration comprises the globally unique identifier of each of the plurality of network adapters;
    (c) determining a corresponding communication technology for each of the plurality of network adapters; wherein the corresponding communication technology allows the each of the plurality of network adapters to connect to a corresponding access network; wherein the first network adapter and the second network adapter are first configured to use a first communication technology; wherein when the first network adapter and the second network adapter are restricted to use the first communication technology even when networks corresponding to other communication technologies are available;

(d) establishing end-to-end connections using at least two of the plurality of network adapters;

(e) if a second condition is satisfied: transmitting and receiving data through the first group of network adapters using the corresponding communications technology of each of the first group of network adapters; if the second condition is not satisfied: transmitting and receiving data through the second group of network adapters using a corresponding communications technology of each of the second group of network adapters; wherein the second condition is satisfied if at least one end-to-end connection is established through the first group of network adapters; wherein the data is transmitted and received through an aggregated end-to-end connection and wherein the aggregated end-to-end connection comprising a plurality of end-to-end connections established through at least one of the first group of network adapters;

(f) when an access network using the first communication technology is not accessible through the first network adapter: transmitting and receiving data through the second network adapter using the first communication technology instead of transmitting and receiving data through the first network adapter;

(g) when the access network using the first communication technology becomes accessible again through the first network adapter, or the first network adapter connects to another access network using the first communication technology, starting to use the first network adapter for transmitting and receiving data;

(h) when the first condition is based on location and the first condition is satisfied when the network device is used in a first location: restricting the network device to use a third communication technology when the network device is in a first geographical area; and restricting the network device to use the first communication technology when the network device is outside the first geographical area; wherein a first geographical location range has at least one network using a second communication technology;

wherein each network adapter of the first group of network adapters is configured by a configuration corresponding to the each network adapter;

wherein when the data is latency sensitive, a communication technology with a low latency is selected as the first communication technology; and wherein the corresponding communication technology is a wireless communication technology.

11. The network device of claim 10, wherein the first network adapter and the second network adapter use a default communication technology before establishing the end-to-end connection.

12. The network device of claim 10, wherein the first network adapter is configured to use a second communication technology when no Virtual Private Network (VPN) connection is established through the first network adapter.

13. The network device of claim 12, wherein the first condition is satisfied if the network device is being used at a first geographical location.

14. The network device of claim 10, wherein the end-to-end connections are implemented using Transmission Control Protocol (TCP/IP), User Datagram Protocol (UDP/IP), IPSec or other Virtual Private Network (VPN) technologies.

15. The network device of claim 10, wherein the performance metric is based on at least one of throughput, error rates, packet latency, packet jitter, symbol jitter, quality of service, bandwidth, bit error rate, packet error rate, frame error rate, dropped packet rate, queuing delay, round trip time, capacity, signal level, interference level, bandwidth delay product, handoff delay time, signal-to-interface ratio, and signal-to-noise ratio.

16. The network device of claim 10, wherein the corresponding communication technology is selected according to at least one criterion;

wherein the at least one criterion is selected from a group consisting of data type, traffic pattern, port number, application, and protocol.

17. The network device of claim 10, wherein all of the first group of network adapters are configured to use the first communication technology.

18. The network device of claim 10, wherein the first group of network adapters comprises a third network adapter; wherein the third network adapter uses the first communication technology for transmitting data and a second communication technology for receiving data.

* * * * *